United States Patent
Rao

(10) Patent No.: US 8,433,299 B2
(45) Date of Patent: Apr. 30, 2013

(54) SYSTEM FOR PROVIDING INTERACTIVE MEDIA TO USER OF MOBILE DEVICE

(76) Inventor: Bindu Rama Rao, Laguna Niguel, CA (US)

( * ) Notice: Subject to any disclaimer, the term of this patent is extended or adjusted under 35 U.S.C. 154(b) by 0 days.

(21) Appl. No.: 13/397,136

(22) Filed: Feb. 15, 2012

(65) Prior Publication Data

US 2012/0159526 A1 Jun. 21, 2012

Related U.S. Application Data

(63) Continuation of application No. 11/888,100, filed on Jul. 30, 2007, now Pat. No. 8,131, 270.

(60) Provisional application No. 60/899,493, filed on Feb. 5, 2007.

(51) Int. Cl.
*H04M 3/42* (2006.01)

(52) U.S. Cl.
USPC ....... 455/414.1; 455/66.1; 455/557; 345/949; 345/956; 345/473

(58) Field of Classification Search ............... 455/414.1, 455/53.1, 66.1, 70, 90.2, 140, 415.1, 550.1, 455/557, 463, 566; 345/473–475, 687–688, 345/949, 956, 60–62, 661, 676, 522, 536–541, 345/547, 501, 650, 534–532; 705/14.58, 705/14.64, 15.56

See application file for complete search history.

(56) References Cited

U.S. PATENT DOCUMENTS

| | | | |
|---|---|---|---|
| 6,941,324 B2* | 9/2005 | Plastina et al. | 1/1 |
| 7,405,752 B2* | 7/2008 | Kondo et al. | 348/222.1 |
| 7,660,864 B2* | 2/2010 | Markki et al. | 709/207 |
| 2001/0047373 A1* | 11/2001 | Jones et al. | 707/515 |
| 2002/0001395 A1* | 1/2002 | Davis et al. | 382/100 |
| 2002/0054089 A1* | 5/2002 | Nicholas et al. | 345/745 |
| 2002/0059621 A1* | 5/2002 | Thomas et al. | 725/87 |
| 2003/0009371 A1* | 1/2003 | Gauba et al. | 705/10 |
| 2003/0233422 A1* | 12/2003 | Csaszar et al. | 709/206 |
| 2005/0005174 A1* | 1/2005 | Connors | 713/202 |
| 2005/0144538 A1* | 6/2005 | Lawrence et al. | 714/47 |
| 2005/0235318 A1* | 10/2005 | Grauch et al. | 725/46 |
| 2006/0206493 A1* | 9/2006 | Lipscomb et al. | 707/10 |
| 2006/0265281 A1* | 11/2006 | Sprovieri et al. | 705/14 |
| 2007/0136773 A1* | 6/2007 | O'Neil et al. | 725/100 |
| 2007/0157223 A1* | 7/2007 | Cordray et al. | 725/13 |

* cited by examiner

*Primary Examiner* — Kamran Afshar
*Assistant Examiner* — Marisol Fahnert
(74) *Attorney, Agent, or Firm* — McAndrews, Held & Malloy, Ltd.

(57) ABSTRACT

A system for mobile devices that facilitates the creation and dissemination of interactive media to a plurality of mobile devices. A computer or PC comprising an interactive media generator is used to generate interactive media and communicate it to a distribution server. Mobile devices have an interactive media client component to receive and present interactive media to a user.

16 Claims, 10 Drawing Sheets

SYSTEM FOR PROVIDING INTERACTIVE MEDIA TO USER OF MOBILE DEVICE

CROSS REFERENCES TO RELATED APPLICATIONS

The present application is a continuation of U.S. patent application Ser. No. 11/888,100, entitled "SYSTEM FOR PROVIDING INTERACTIVE MEDIA TO USER OF MOBILE DEVICE," filed Jul. 30, 2007, now U.S. Pat. No. 8,131,270, which makes reference to, claims priority to, and claims benefit of U.S. Provisional Application Ser. No. 60/899,493 entitled SYSTEM FOR PROVIDING INTERACTIVE MEDIA TO USER OF MOBILE DEVICE filed on Feb. 5, 2007, the complete subject matter of each of which is hereby incorporated herein by reference, in its respective entirety.

The present application is a continuation-in-part (CIP) of pending US non-provisional patent application entitled AUDIO GUIDED SYSTEM FOR PROVIDING GUIDANCE TO USER OF MOBILE DEVICE ON MULTI-STEP ACTIVITIES filed on Jul. 25, 2007, which is a non-provisional patent application based on a U.S. Provisional patent application Ser. No. 60/860,700, with the same title, filed on Nov. 22, 2006, the complete subject matter of both is hereby incorporated herein by reference, in their entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States patent application is hereby incorporated herein by reference, in its entirety.

This patent application makes reference to U.S. Provisional Patent Application Ser. No. 60/530,175, entitled "QUESTIONNAIRE NETWORK FOR MOBILE HANDSETS AND A TRADING SYSTEM FOR CONTRACTS ON USER COMMITMENTS TO ANSWER QUESTIONNAIRES," filed on Dec. 17, 2003. The complete subject matter of the above-referenced United States Provisional patent application is hereby incorporated herein by reference, in its entirety.

This patent application makes reference to U.S. patent application Ser. No. 10/985,702, entitled "QUESTIONNAIRE NETWORK FOR MOBILE HANDSETS," filed on Nov. 10, 2004. The complete subject matter of the above-referenced United States patent application is hereby incorporated herein by reference, in its entirety.

This patent application makes reference to United States provisional patent entitled "QUESTIONNAIRE CLIENT FOR MOBILE DEVICE", filed on Oct. 4, 2006. The complete subject matter of the above-referenced United States patent application is hereby incorporated herein by reference, in its entirety.

This patent application makes reference to United States provisional patent entitled "MOBILE DEVICE FOR CREATING ADHOC QUESTIONNAIRE", filed on Oct. 7, 2006. The complete subject matter of the above-referenced United States patent application is hereby incorporated herein by reference, in its entirety.

This patent application makes reference to United States provisional patent entitled "QUESTIONNAIRE SERVER CAPABLE OF PROVIDING QUESTIONNAIRES BASED ON DEVICE CAPABILITIES", filed on Nov. 13, 2006. The complete subject matter of the above-referenced United States patent application is hereby incorporated herein by reference, in its entirety.

BACKGROUND

1. Technical Field

The present invention relates generally to the interactions between mobile device and a server within a network, and more specifically to the ability to provide interactive media to a user of a mobile device.

2. Related Art

Electronic devices, such as mobile phones and personal digital assistants (PDA's), often contain small screens with very limited viewing area. They are constrained in terms of how much information can be displayed, and in terms of user interaction capabilities. The keyboards on cell phones, for example, are not conducive for user data entry, and only brief user inputs can be solicited from a user without annoying the user.

Often a user would want to seek online help using a mobile phone for conducting an activity such as fixing a problem with a car (changing tires for example) or baking a cake, without having to use a bulky notebook computer that might get damaged due to various constraints and problems of a work area. The use of a computer/notebook is not always possible to retrieve help information when they are needed, such as during an accident on the highway or while cooking in a kitchen that has limited space. The use of a mobile phone is preferable in such circumstances but mobile phone in general are not endowed with the features or applications necessary to facilitate easy access to such information in a format that is useable and convenient. The whole process of retrieving necessary information using a mobile phone is inconvenient due to the inability of the Internet websites to provide information that a typical user can easily read, browse through or view on his mobile phone.

Information access from typical Internet based websites from mobile devices are quite often unsatisfactory and not useful due to several factors, not least of which is the multimedia and graphics rich format in which most Internet websites are designed and made available and the verbosity of text. A mobile phone with a small screen is not a good candidate for viewing such complicated and graphics rich (with graphics, flash screens, video components, etc.) content—imagine a webpage being presented to a user that a music component, a whole a page of text (over 3 KB of text) and three large diagrams, and a table of information, all on the same webpage. Such a multi-media webpage is very typical, and is obviously unsuitable for a mobile device.

User interaction in real time, such as those provided for a user using a PC on the Internet, are often not possible for a user using a cell phone. For example, the amount of textual information cannot be a full page of textual information that is typically made available to a PC. Graphical information also cannot be large and too many graphical images should not be on the same webpage. A typical website provides a rich multi-media experience that has several graphical images, large amounts of text, tables, etc. The same website, when accessed from a cell phone, would not only be unreadable, due to its large amount of text, graphics and even video, but also frustrating due to the nature of web sites—the design of websites often being multi-media based (predominantly providing large multi-media web pages full of text, graphics, flash-based and even containing videos). Often webpages on the Internet provide detailed information to a user while soliciting inputs from a user. Thus, there is a problem in presenting a mobile user with information in order to solicit user input when the user is using a cell phone. Soliciting user input from a user when the user is using a cell phone, rather than a PC, is a big problem.

Mobile devices such as a cell phone are therefore devices for which traditional websites are ill prepared to provide information. In addition, surveys or questionnaires that are created for Internet based access via a PC are not appropriate for cell phone access. Asking one or more detailed questions with information on how to answer them is possible on a web page that is accessed from a PC. However, the same web page would be unmanageable and difficult to browse and navigate on a cell phone with a small LCD screen and small keyboard for user input.

Further limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

The numerous objects and advantages of the present invention may be better understood by those skilled in the art by reference to the accompanying figures in which:

FIG. 1 is a perspective block diagram of an system for mobile devices that facilitates the creation and dissemination of interactive media to a plurality of other recipient mobile devices, wherein the interactive media is disseminated to the recipient mobile devices in a form that is compatible with the capabilities of the respective recipient mobile devices, and wherein the preferences of the user are also factored in.

DETAILED DESCRIPTION OF THE DRAWINGS

Figure 1:
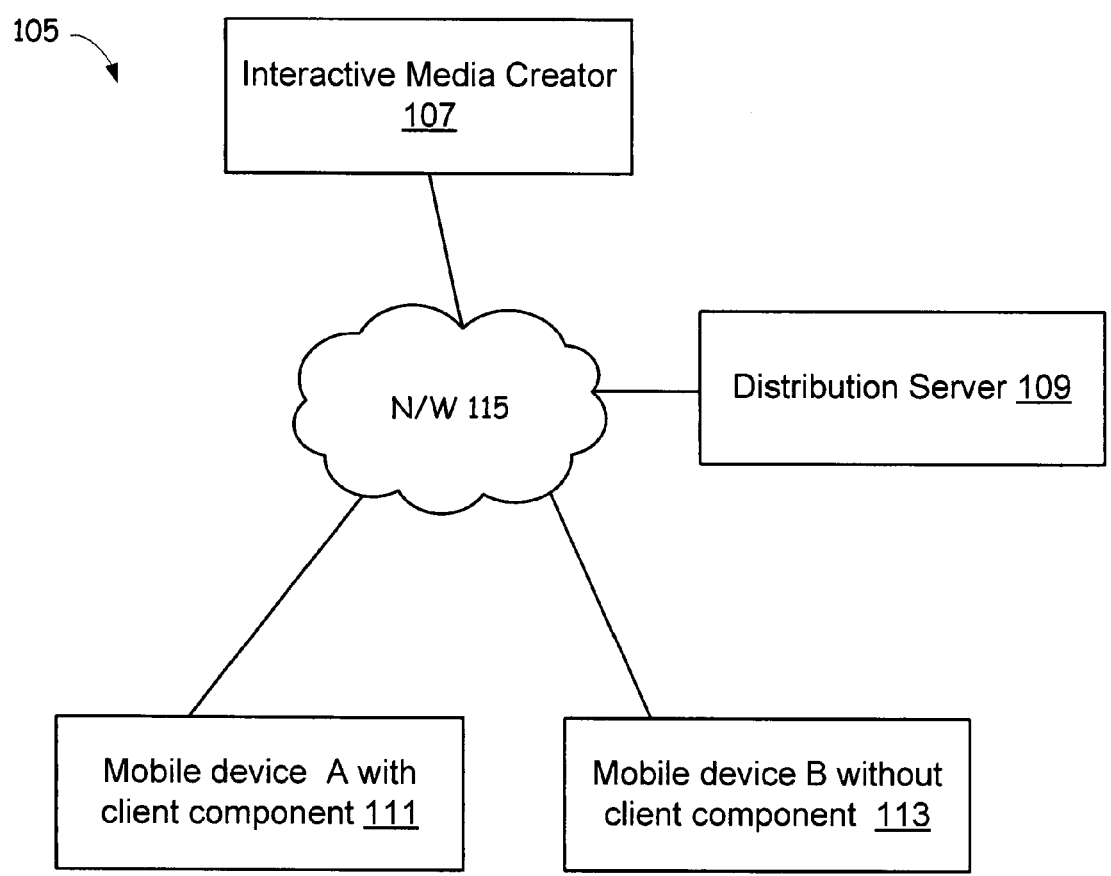

FIG. 1 is a perspective block diagram of an system 105 for mobile devices that facilitates the creation and dissemination of interactive media to a plurality of other recipient mobile devices 111, 113, wherein the interactive media is disseminated to the recipient mobile devices 111,113 in a form that is compatible with the capabilities of the respective recipient mobile devices 111, 113, and wherein the preferences of the user are also factored in. The system 105 comprises the interactive media creator 107, the plurality of other recipient mobile devices 111, 113 and a distribution server 109. The display of interactive media in a recipient mobile device, such as the recipient mobile device A 111, requires the use of a corresponding client component, such as a QClient, that can display/render interactive media, one at a time.

Each interactive media can comprise several components, some of which are graphics, video content, textual content, and/or audio content. These components may be adapted to the device to make them more appropriate for the recipient devices. For example, graphics may be made more compatible (smaller or compact) to a device if it is not capable of displaying a default size (albeit small) presented by a interactive media creator 107.

The interactive media creator 107 that is communicatively coupled to the distribution server 109 via network 115 makes it possible for a user, such as an advertisement designer, to incorporate text, audio, voice, music, video, graphics etc. into the interactive media. For example, each interactive media that is an audio guided activity (AGA) comprises textual descriptions, audio preambles, optional audio supplementary information, an optional textual supplementary information, for each step of a multi-step audio guided activity. An AGA is used to describe the method to cook a dish using an associated recipe, the process of executing an operation, such as changing the tire on a car, using an associated multi-step operation, etc. The display of each step in a mobile device 111 involves the display of textual descriptions, the playing of audio information such as a preamble, the optional display of supplementary information and the playing of audio supplementary information, if available. A user can view (often using text, and even graphics if available) and optionally listen to the detailed descriptions of each step of an AGA, one step at a time, and browse through each step.

An interactive media that is an advertisement may comprise at least one of a graphic, music component, textual component and a video component, with simple user inputs such as a start, stop, pause, advance, cancel, replay, etc. For example, a simple advertisement may have just some text and a small graphic, with some background music that plays for 10 seconds, with user interaction supported for retrieving additional information, terminating the advertisement, and for advancing to the next advertisement.

Some of the plurality of recipient mobile devices 111, 113 can be legacy devices that do not have a necessary client component capable of handling the download and display of interactive media. Others of the plurality of other recipient mobile devices 111, 113 have the client component capable of handling the download and display of the interactive media.

In one embodiment, the distribution server 109 determines which recipient mobile device can handle interactive media (because they comprise the client component capable of handling the interactive media, and because the interactive media comprise metadata used to determine appropriateness for a device), and which need to be sent a simpler subset of the interactive media that can be displayed/rendered without the client component, such as by the use of a browser in the recipient mobile device. The browser may then be used to browse through a hosted version of the interactive media that is presented as a set of one or more web pages by the distribution server 109.

The interactive media is created/stored/distributed as a packaged content with associated metadata, employing a structured format such as an XML file. For example, for an advertisement presented as interactive media, the following components may be provided:

an audio preamble, used to describe in audio form the purpose of the current advertisement and provide an overview of the product or service (other types of information may also be provided if necessary, in audio format)

a textual step description regarding the product or service, in succinct form, with minimal text, and an audio supplementary information, providing additional details that may help a user better understand the product or service, its benefits, alternate products, if any, and any additional detail that may aid the user's comprehension of the product or service.

The distribution server 109 is capable of converting recipient list to a list of phone numbers or IP addresses as needed, in order to communicate the interactive media, or a notification regarding the availability of interactive media, to the recipient mobile devices 111, 113. In order to play all the components of an interactive media, if required, the recipient devices, such as the recipient device 111, have a client component that can handle all the components of an interactive media, audio, textual, graphics and even video components.

In one embodiment the client component, an interactive media client, is required in a recipient mobile device 111 to handle the components of an interactive media, such as audio components and textual components.

Some mobile devices, such as recipient mobile device B 113, may not have the interactive media client. In order to play all the components of an interactive media, if required, the recipient devices, such as the recipient mobile device B 113, do not have a client component. Instead, the distribution server 109 makes it possible for them to receive and display/play the interactive media by sending them the same interactive media in an alternate form, such as a simplified set of web pages, that the recipient mobile device B 113 can display using a browser or some other existing client in the recipient mobile device 113. In addition, the recipient mobile device B 113 will be sent a notification regarding the availability of an appropriate interactive media, the notification also comprises a link that can be activated to download the interactive client component so that it could be installed, before displaying the interactive media.

The recipient mobile device B 113 without the interactive media client component gets an opportunity to download & install the necessary client component. The user can then activate the download link provided (in a notification) whereupon the interactive media client component is downloaded and installed automatically (or with user opt-in). The user of the recipient mobile device B 113 also is given the option, selectively, to receive a subset of interactive media that the recipient mobile device B 113 can handle without the client component.

The recipient mobile device 111 with the interactive media client component receives an interactive media, lets user browse through the interactive media (if there are multiple steps or segments, user can browse through each step or segment, and view the textual components and listen to audio components for each, interact with the interactive client component at the appropriate places, etc. It is able to play/render/display all portions of an interactive media that may be provided, such as audio, text, graphics, video, etc. while also soliciting and acquiring user inputs at the appropriate places for the appropriate actions.

The distribution server 109 is capable of enhancing or modifying a received interacte media from a vendor or source that generates them. For example, the interactive media creator 107 may send an incomplete interactive media with two segments, each with only the audio preamble created (by a user recording the steps of an activity in audio form that incorporates a brief descriptions of steps involved) and the distribution server 109 incorporates a generic textual preamble and a generic textual description in order to complete the interactive media.

The distribution server 109 receives an interactive media from a user, incorporates text or graphics as needed, and inserts a generic or customized prompt to user, and sends the modified interactive media to recipients. The list of recipients are either specified by the user (such as an advertising company) along with the interactive media or pre-configured and stored in the server 109 to be used to forward interactive media. In addition, the user might only provide a profile of recipients, or even multiple profiles of potential recipients, and the distribution server 109 is capable of identifying actual recipients based on these profiles. For example, if a profile provided identifies potential recipients as middle aged individuals with income of over $50,000 with interests in sports and music, the distribution server 109 is capable of identifying actual recipients and targeting them for the delivery of the interactive media. In one embodiment, it identifies recipients by searching through a database of registered recipients (individuals or companies that have registered to receive the interactive media), and have provided a profile comprising their interests (sports, music, hiking, etc.) and hobbies, their preferences for interactive media categories, etc. In another embodiment, the distribution server 109 searches through one or more databases of subscriber information, the databases managed by it or managed by external systems or service providers. For example, the database may be maintained and managed by a real estate company (comprising their potential clients) and a bank (comprising their valued customers).

The distribution server 109 also supports both pull and push mode distribution of interactive media to mobile devices 111. It can send a notification of the availability of the interactive media (that a recipient may be interested in), and the recipient can trigger the retrieval of the interactive media by selecting it from a list or by some equivalent action on the mobile device 111. The triggering, or in general, the user interaction is facilitated by a interactive client component in the recipient mobile device 111, which is either made available by the manufacturer of the mobile handsets or subsequently downloaded over the air by the recipient from a server, or otherwise installed by the recipient (such as an owner of the mobile device 111). The interactive client component is able to process the received interactive media (or portions thereof), playing audio portions such as audio preambles, audio supplementary information, etc. and displaying graphics, textual preambles and textual descriptions of individual segments of a multi-segment content, facilitating interaction by user during the viewing.

In one embodiment, the system 105 comprises interactive media generator 107, mobile devices 111, 113 which are a combination of cellular phones, PDAs, etc., and the network 115 that is a wireless and/or wired network, cellular network such as 3G, UMTS, CMDA, GSM, etc., a WLAN network, or a WiMAX network, Internet, Bluetooth, IrDA, etc.

Figure 2:
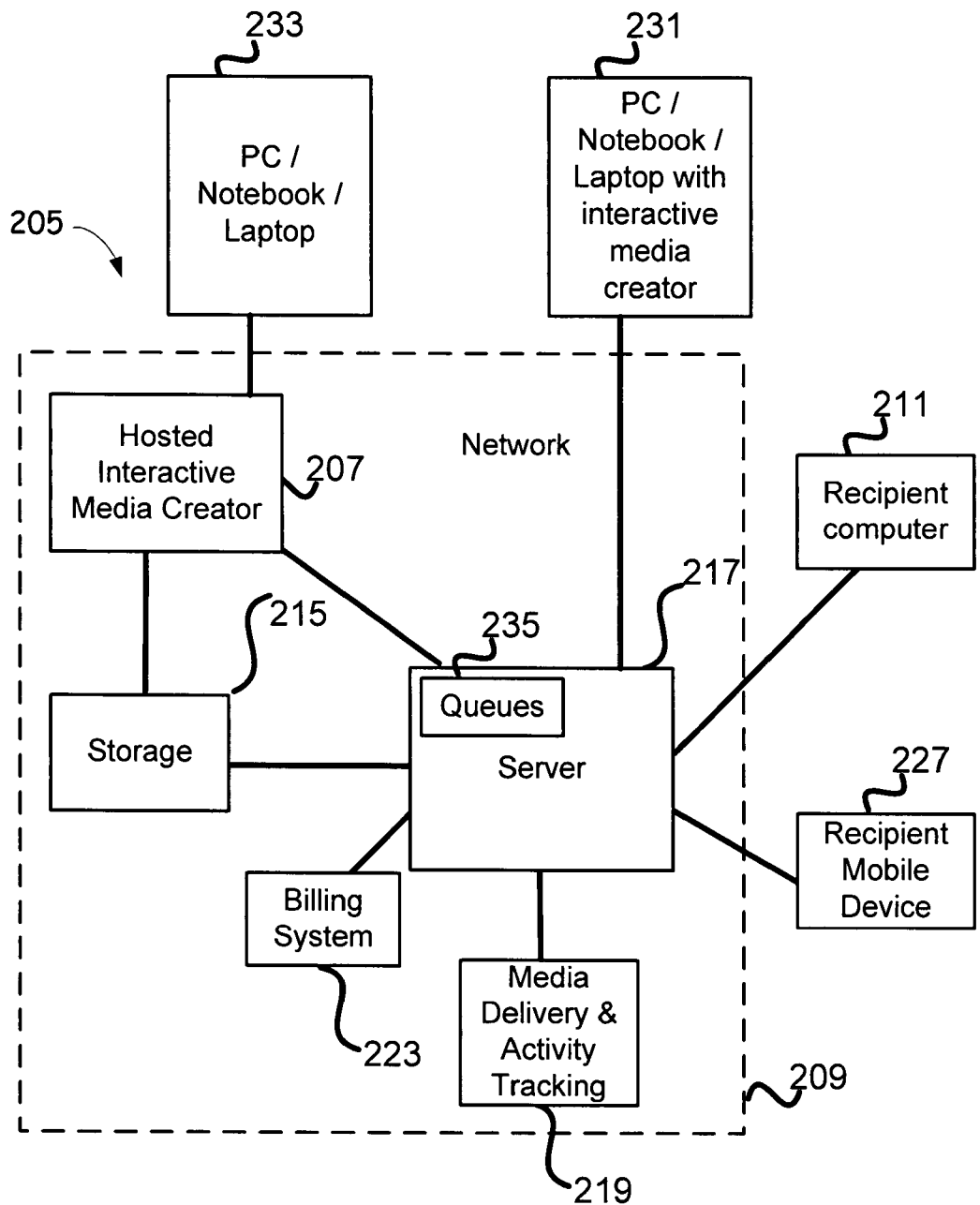
FIG. 2 is a perspective block diagram of a system that supports interactive media creation and dissemination, that is facilitated by the use of a PC/computer, by a user, or by a hosted interactive media creator that is accessed by the user using a PC/notebook/laptop.

FIG. 2 is a perspective block diagram of a system 205 that supports interactive media creation and dissemination, that is facilitated by the use of a PC/computer 231, by a user, or by a hosted interactive media creator 207 that is accessed by the user using a PC/notebook/laptop 233. The system 205 comprises the PC/computer 231 that a user uses to create interactive media, a server 217 that receives the interactive media and sends them to one or more recipient mobile devices 227 and recipient computer 211, and the hosted interactive media creator 207 that facilitates interactive media creation using the PC/laptop/computer 233, or via web pages provided by the server 217.

The system 205 also comprises a storage 215 that is used to store interactive media, user profiles, required user profiles desired by individuals or companies interested in disseminating interactive media. It also comprises a media delivery & tracking component 219 that stores results and activity logs that can be used to track interactive media creation, dissemination, and other related activities. In addition, the system 205 comprises a billing system 223 that can facilitate billing for the creation of interactive media, the distribution of interactive media, the charges or payments made to recipients of interactive media for viewing the interactive media, the charges made to individuals and companies when a recipient views delivered interactive media, etc. In general, interactive media comprises content (with or without graphics and multimedia) that requires a user to interact with a client in the viewing of it, the experience comprising user interaction. User interaction comprises user making a selection, choosing one or more items, clicking on displayed information, advancing, entering text as user inputs, providing audio inputs, or a combination of these.

The server 217 comprises a plurality of queues 235 for each user, wherein each of the plurality of queues holds a different category of interactive media for a recipient, or references to interactive media of a specific type of category that a user is likely to be interested in. In another related embodiment, the server 235 maintains several queues 235 of interactive media, some of the queues dedicated to specific categories of interactive media, to specific companies creating the interactive media, or to user groups. Other types of queues are also contemplated. When a new entry is made to any queue, target recipients are identified by the server 217 and the interactive media is either communicated to the recipients, a notification of its availability is communicated to the recipients while an entry is made in a queue for each of the recipients in the server 217 with a reference (such as an identification) to the actual interactive media stored along with it, or a copy of the interactive media is entered into a queue that is delivered to a recipient or browsed through by the recipient using the recipient mobile device 227.

Interactive media creation is also facilitated by the hosted interactive media creation component 207 that can be accessed and used by a user employing the PC/Notebook/Laptop 233. An interactive media creation tool installed in the PC/Notebook/Laptop 231 may also be used by a user to create interactive media that can be uploaded to the server 217. A user with interactive media creation tool in the PC/Notebook/Laptop 231 creates an interactive media and sends the created interactive media to recipients/a mailing-list that the server 217 can communicate with.

The user can also employ a PC/Notebook/Laptop 231 communicatively coupled to a hosted interactive media creation component 217 to create interactive media with only audio inputs and textual inputs provided by the user for the various steps of an associated activity. The interactive media is likely to comprise of audio and/or textual preambles for the steps of an audio guided activity, textual descriptions of the steps of the associated activity, supplementary information in audio and textual formats (even graphics and video formats) for each of the segments (if there are multiple segments), etc. Then the user provides a recipient list in one or more formats. The server 217 sends out the interactive media to recipients specified by the user, using their corresponding mobile phone numbers, IP addresses, email addresses, etc. A recipient user can use his recipient computer 211 to receive or browse thorough the interactive media. A different recipient user can use the recipient mobile device 227 to do the same.

When a recipient using the recipient mobile device 227 gets the interactive media on his mobile device, the segments of the interactive media themselves are provided to the recipient by the server 217, starting with the first segment of a multi-segment activity. Thus, in the beginning of the interactive media, the recipient would view the first segment, perhaps with an audio preamble and appropriate textual description, and would be able activate an Info menu item to hear the audio preamble for the first segment. The user advances to the next segment by activating the Next menu item to proceed, etc. Alternatively, all segments are provided at once to the recipient mobile device 227 wherein the interactive media client component manages its local display/rendering.

In one embodiment, an XML based interactive media is created/stored/by a user using a PC/notebook/laptop 231. It is created as an XML file comprising multiple segments—wherein each segment comprises:

an audio preamble,
graphics
a textual step description, and
an audio supplementary information.

The audio preamble and audio supplementary information are played/rendered during a display of a segment, when invoked by the user using appropriate menu-items or buttons. The textual segment description comprises Textual description in the form of a small paragraph. Optionally, it also comprises a graphics or a picture that is also provided as part of the XML based interactive media.

Figure 3A:
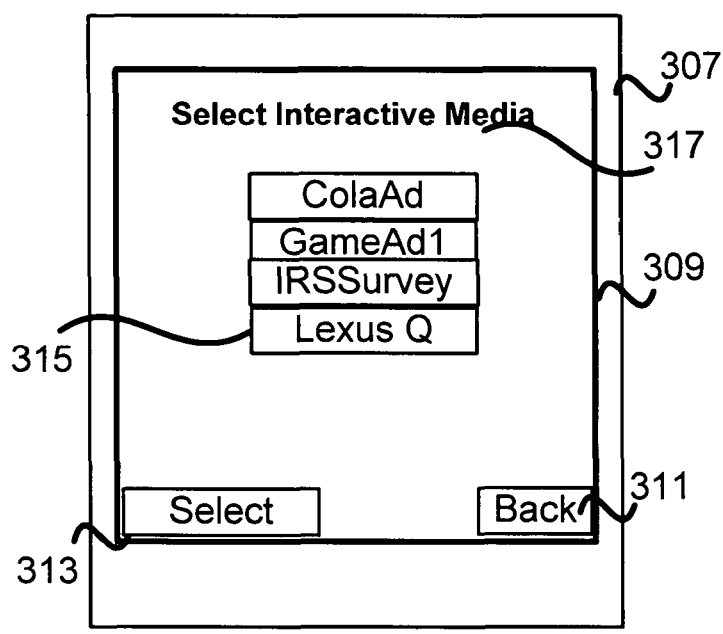
FIG. 3A is an exemplary display screen for a mobile device that supports the display of interactive media using an interactive media client component, or the browsing through an interactive media from the mobile device using a browser.

FIG. 3A is an exemplary display screen 309 for a mobile device 307 that supports the display of interactive media using an interactive media client component, or the browsing through an interactive media from the mobile device 307 using a browser. The mobile device 307 receives notifications, such as those received as an SMS message, sent to the user (for example, message of type Service message). The notifications offers the user an opportunity to download a client component that is capable of displaying an interactive media. The exemplary display screen 309 provides a list of interactive media 315 to the user, and the user can select one of them for display using a select button 313 or menu item provided. The user can exit the interactive media client by activating the back button 311 or menu item.

In one embodiment, the list of interactive media 315 are those provided to the user by a distribution server. Such a list is provided based on user preferences and user profile by a server. A user can subscribe to one or more categories of interactive media, or one or more sources of interactive media (sources being content development companies, etc.) and the distribution server stores that information as part of the user's preferences and selects interactive media for delivery to the mobile device 307 based on that. In a related embodiment, such a list is provided based on a priority of interactive media determined by the distribution server. In a different embodiment, the user's selections of various subscriptions of interactive media is managed by the distribution server which provides an RSS feed of the selected interactive media to the user on his mobile device 307.

In one embodiment, the mobile screen 309 is a screen saver screen that is displayed to the user when the user is not using the phone (meaning the phone has been idle for a while). The screen saver 309 on the mobile gets a list of interactive media, such as a list of interactive mobile advertisements and surveys, and displays it to the user. The user can select one of them, and advance to others subsequently, and exit the screen saver whenever the user wants to. In one embodiment, the screen saver 309 is provided references to interactive media as a list to be displayed, wherein the list is complied by a server based on user's preferences, subscriptions to interactive media, user profile (comprising user's interests, hobbies, employment, residential location, etc.) or a combination thereof.

Figure 3B:
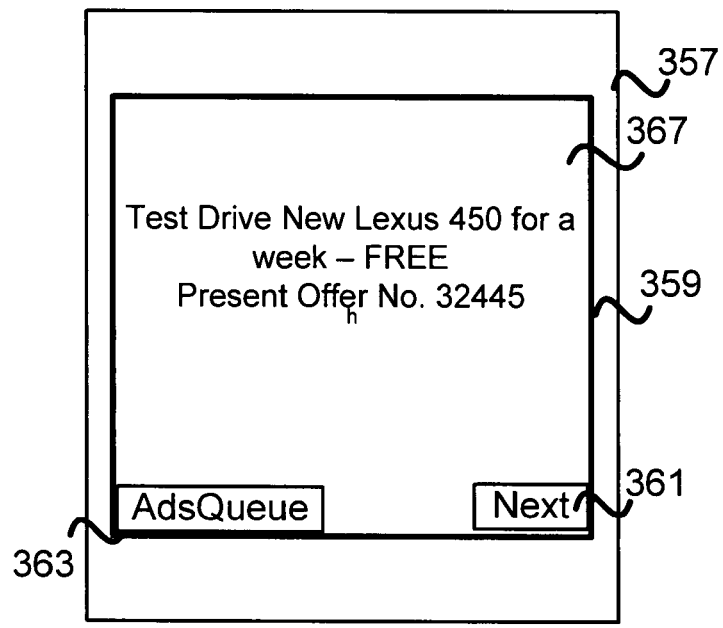
FIG. 3B is an exemplary screen of an interactive media client component on a mobile device wherein an interactive advertisement is displayed, that has been selected from an queue of advertisements.

FIG. 3B is an exemplary screen of an interactive media client component 359 on a mobile device 357 wherein an interactive advertisement 367 is displayed, that has been selected from an queue of advertisements 363. Using a Next button 361 on the screen 359, a user can advance to the next interactive media on the current queue AdsQueue 363. The screen of the client component 359 can display interactive media from different queues when a user changes the current queue or select a queue by selecting one from a list of queues (shown in FIG. 3A). Each user has at least one queue of waiting interactive media at a server (not shown), that is accessible by the interactive media client component 359. A user can set the priority of interactive content from each queue, or a priority for content from more than one queue, or prioritize queues. A user can create a profile of user's interests, hobbies, employment, etc. that is incorporated for prioritizing interactive media selected and presented to the user.

Figure 3C:
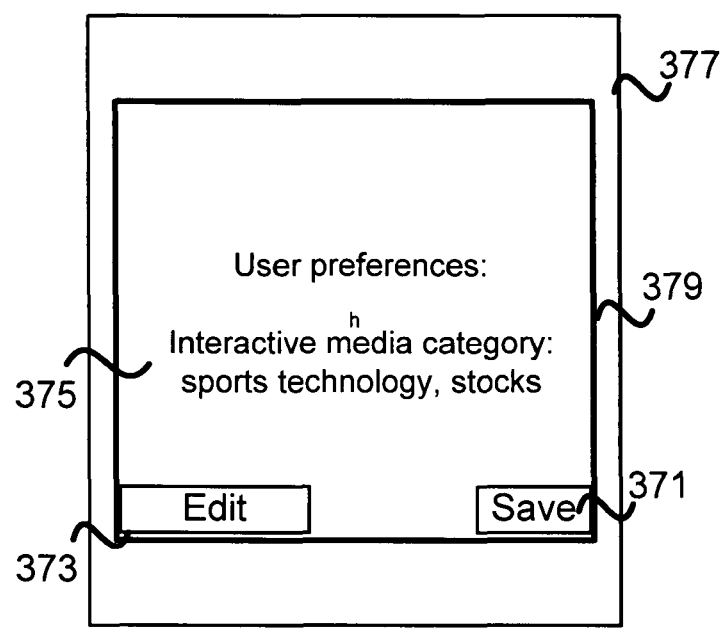
FIG. 3C is an exemplary screen/window on a mobile device that is used to by a user to set user preferences, specifically a selection of categories of interactive media to be delivered to the user, a priority being assigned to them too.

FIG. 3C is an exemplary screen/window 379 on a mobile device 377 that is used to by a user to set user preferences, specifically a selection of categories of interactive media to be delivered to the user, a priority being assigned to them too. The user preferences selected/provided by a user is communicated to a server that stores it and employs it to send interactive media to the user. The server selects/provides interactive media to the user satisfying user specified needs and preferences from the available interactive media, which is supplied by vendors of products, advertisers of products, services or suppliers of information or products, etc. The screen 379 makes it possible for a user to edit 373 the user preferences and save 371 updated preferences.

Figure 4:
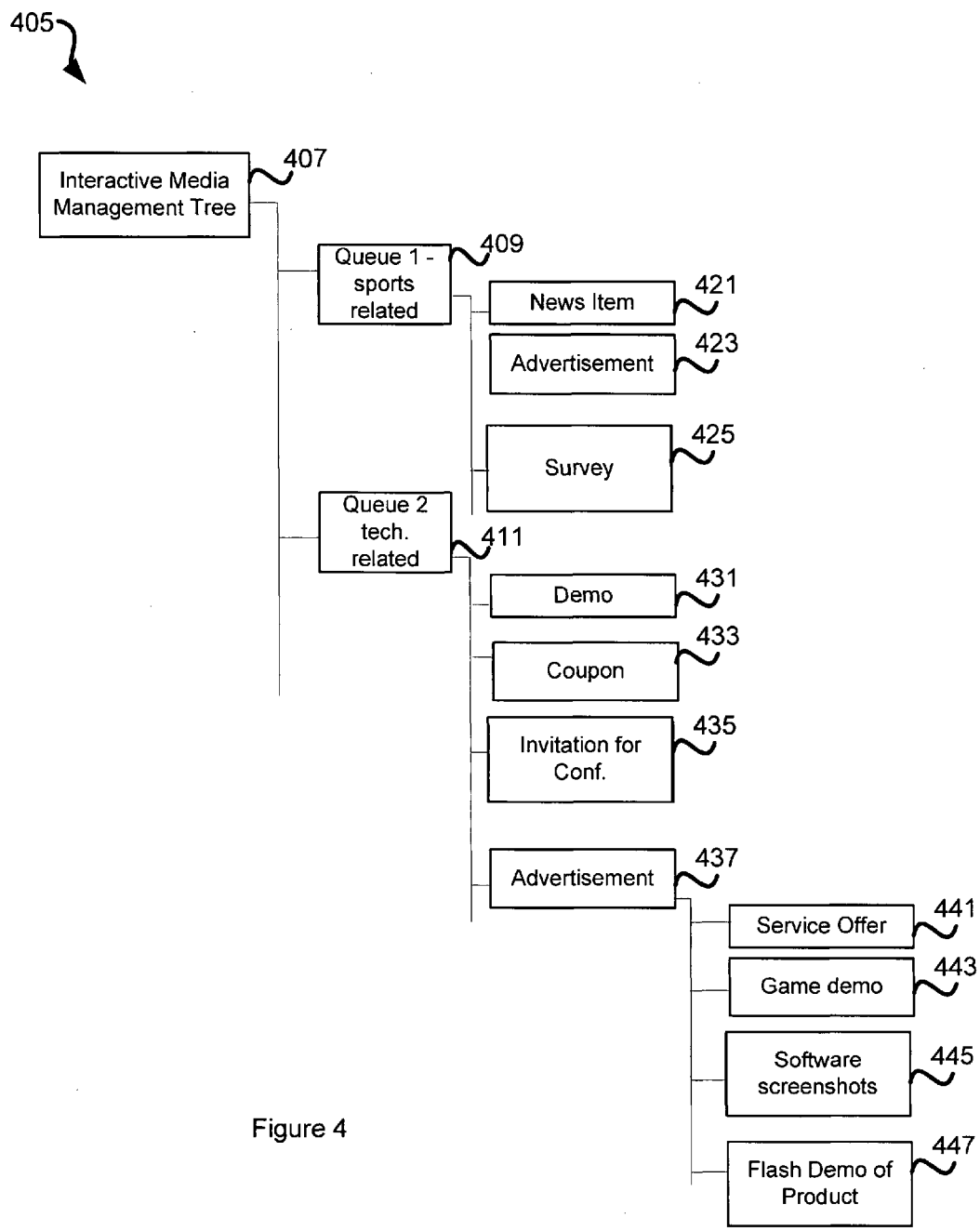
FIG. 4 is a perspective block diagram of the interactive media management tree of information, a logical organization of interactive media, by a server in the system that facilitates creation and distribution of interactive media.

FIG. 4 is a perspective block diagram of the interactive media management tree 407 of information, a logical organization of interactive media, by a server in the system that facilitates creation and distribution of interactive media. The interactive media management tree 407 comprises several categories of interactive media, each category assigned a queue, such as a queue 1 for sports related interactive media 409, which in turn comprises news items 421, advertisements 423 and surveys 425. Similarly, technology related interactive media is assigned a queue 2 411 that can be used to store and distribute interactive media such as interactive demos 431, interactive coupons 433, interactive invitations for conferences 435, interactive advertisements 437, etc. Interactive advertisements 437 can be interactive service offers 441, interactive game demos 43, interactive software screenshots 445 (such as for applications), flash demos of products 447, etc.

Figure 5:
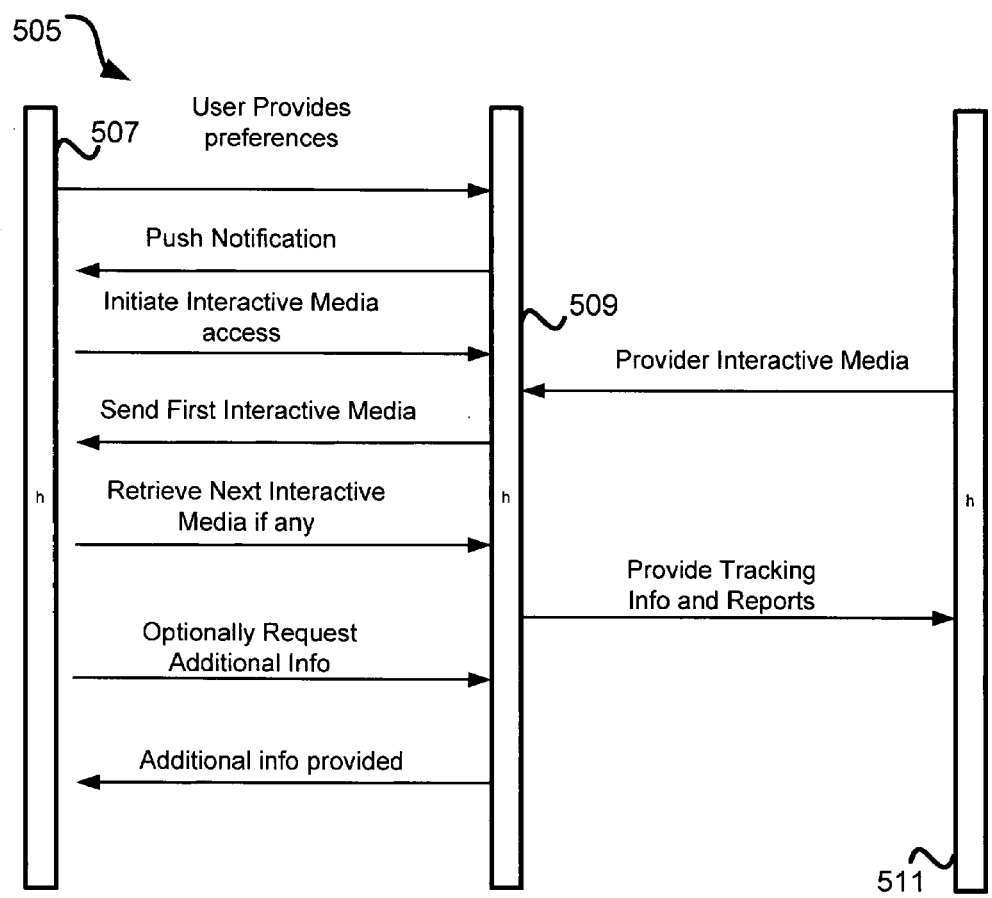
FIG. 5 is an interaction diagram that depicts an exemplary interaction between a recipient device used to respond to the interactive media such as advertisements and questionnaires, wherein the recipient device (a PC, notebook, PDA or laptop) is used by a user to access/retrieve interactive media from one or more distribution servers.

FIG. 5 is an interaction diagram that depicts an exemplary interaction between a recipient device 507 used to respond to the interactive media such as advertisements and questionnaires, wherein the recipient device (a PC, notebook, PDA or laptop 507) is used by a user to access/retrieve interactive media from one or more distribution servers 509. The recipient device 507 provides user preferences, such as categories of interactive media of interest to the user, to the distribution server 509, based upon which the distribution server 509 sends push notification to the recipient device 507. After receiving the push notification, a user can initiate access of (one or more) interactive media. The distribution server sends one or more interactive media to the recipient device for review by the user. Additional info related to/associated with the interactive media, such as details of for products and services associated with interactive advertisements, may be requested by a user and the distribution server 509 sends them to the recipient device 507 for review by a user. The interactive media is typically created using an interactive content creation tool 511 that is communicatively coupled to the distribution server 509. The interactive content creation tool 511, or another external server, such as a billing server, can be the recipient of tracking information and reports sent by the distribution server 509.

Figure 6:
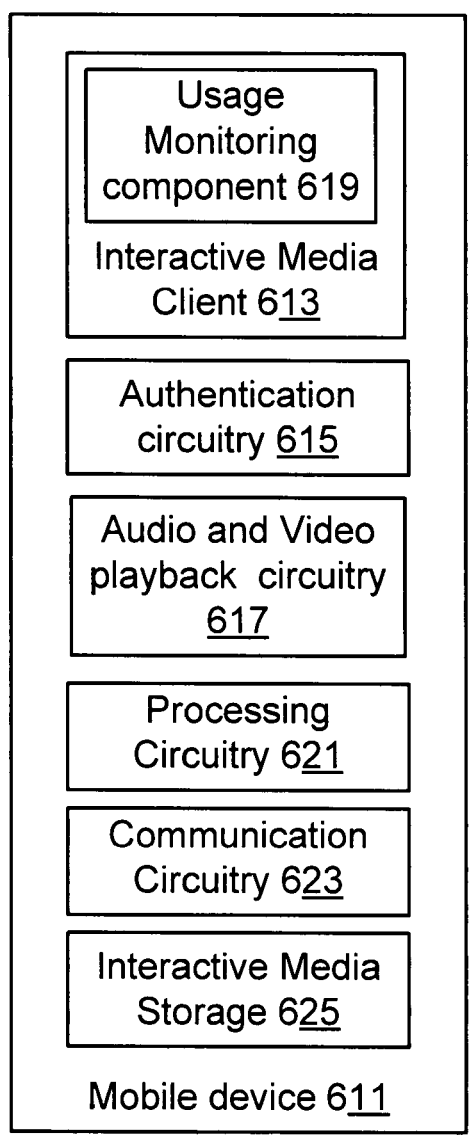
FIG. 6 is a perspective block diagram of a mobile device capable of receiving and playing/rendering interactive media and monitoring its usage.

FIG. 6 is a perspective block diagram of a mobile device 611 capable of receiving and playing/rendering interactive media and monitoring its usage. The mobile device 611 comprises an interactive media client 613 that in turn comprises an usage monitoring component 619. The mobile device 619 also comprises an authentication circuitry 615, an audio and video playback circuitry 617, processing circuitry 621, communication circuitry 623 and an interactive media storage 625.

Figure 7:
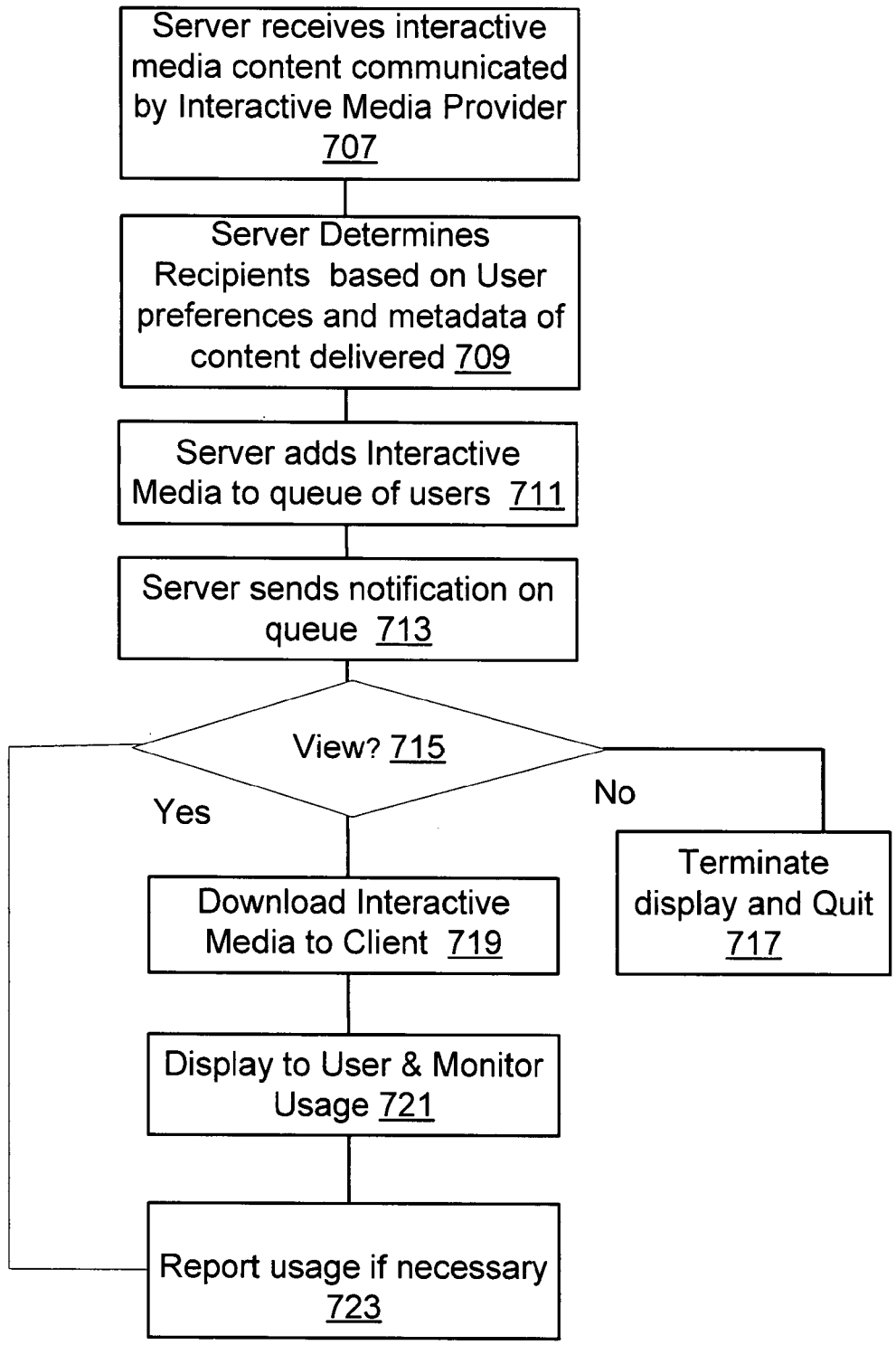
FIG. 7 is a flow chart of the operation of a distribution server as it receives interactive media from a provider and communicates it eventually to users of mobile devices.

FIG. 7 is a flow chart of the operation of a distribution server as it receives interactive media from a provider and communicates it eventually to users of mobile devices. At a start block 707, the operation starts when the server receives interactive media from a provider of interactive media. At a next block 709, the server determines who the recipients should be for the interactive media, based on user preferences available and metadata of the interactive media delivered by the provider. For example, the metadata comprises a category identification, a target profile describing a likely profile of recipients expected to be interested in the interactive media, security information such as credentials of the provider and authentication information, a digital signature of the interactive media for integrity check, etc.

Then, at a next block 711, the server adds the received and authenticated (and integrity checked) interactive media (or reference thereto) to queue of users 711 who are determined to be targets for delivery. Then, at a next bloc 713, the server sends a notification to the user's mobile device to notify the user of the availability of the interactive media in the queue. In one embodiment, the server creates a list of references to the interactive media that is available, and sends it to the mobile device to be shown in a queue/list (or more than one queue/list) from which the user can select.

Then, at a next decision block 715, the user selectively decides to view the interactive media, and either selects it for viewing or terminates viewing. In one embodiment, the user of the recipient mobile device browses through the list of available interactive media and selects one of them for viewing. If the user decides to view one of the items listed, the control passes to a next block 719, otherwise, processing terminates at a next block 717.

If, at the decision block 715, the user on the mobile device decides to view an interactive media (either from a list presented, from a notification received for interactive media or otherwise), at a next block 719, the interactive media client component downloads the interactive media. Then at a next block 721, the interactive media is displayed to enable viewing by the user. The interactive media client component monitors usage by the user. Finally, at the next block 723, the viewing of the interactive media by the user is reported to the server by the client, and optionally to a billing server or external server (such as one associated with the provider) by the server. Then, control loops back to the decision block 715 where the user is provided an opportunity to view additional interactive media that may be available.

Figure 8:
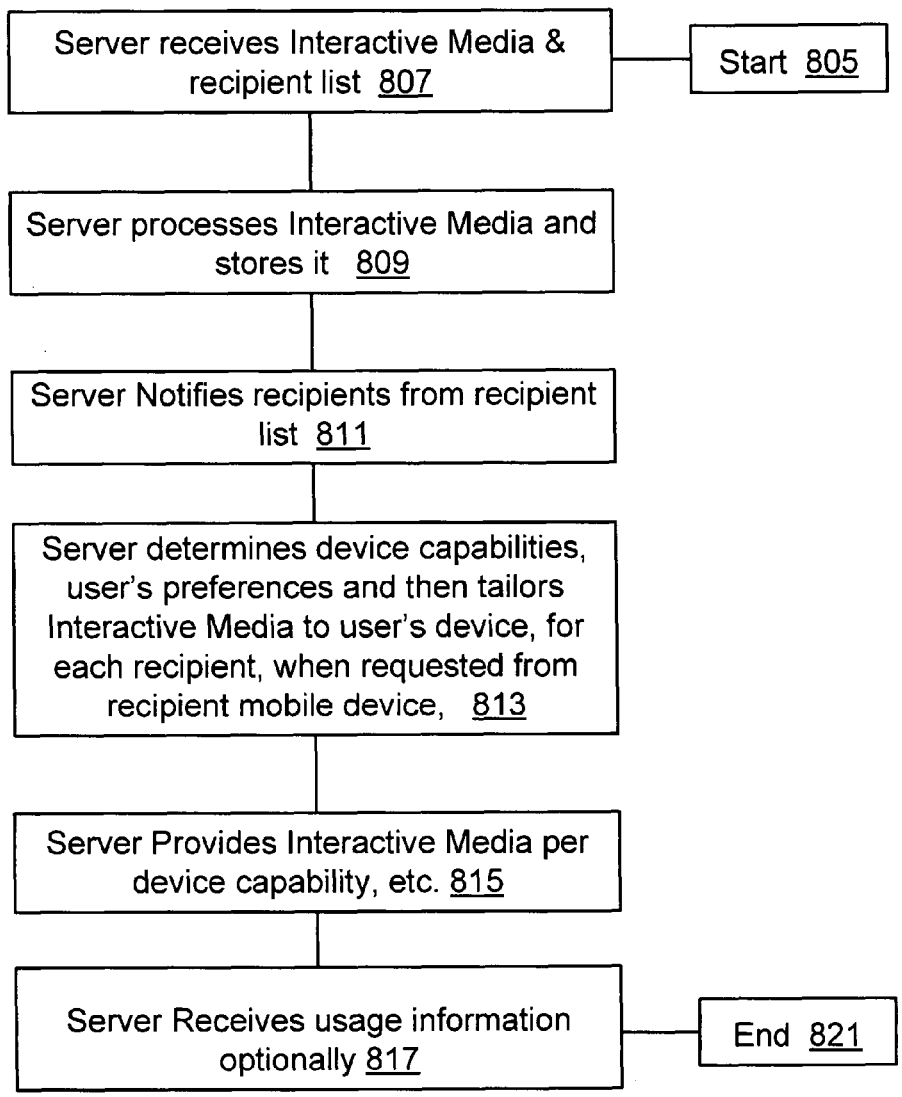
FIG. 8 is a flow chart of an exemplary operation of the server capable of distributing interactive media.

FIG. 8 is a flow chart of an exemplary operation of the server capable of distributing interactive media. Processing starts at a start block 805. Then, at a next block 807, the server receives interactive media and a recipient list from a provider of interactive media. Then, at a next block 809, the server processes the received interactive media and recipient list and stores it. Then at a next block 811, the server notifies recipients from the list about the availability of the interactive media. It can also communicate a reference to the interactive media to the mobile device as part of the notification. Then, at a next block 813, the server determines the device capabilities of the recipient devices, user's preferences, etc. Then the server tailors interactive media to user's mobile device, for each recipient, when requested from recipient mobile device. Then, at a next block 815, the server provides interactive media to each of the recipient devices based on device capabilities. Then, at a next block 817, the server optionally receives usage information from the mobile devices and sends them (after optional collation) to a provider's server (or a billing server). Finally, processing terminates at the next end block 821.

The terms "circuit" and "circuitry" as used herein may refer to an independent circuit or to a portion of a multifunctional circuit that performs multiple underlying functions. For example, depending on the embodiment, processing circuitry may be implemented as a single chip processor or as a plurality of processing chips. Likewise, a first circuit and a second circuit may be combined in one embodiment into a single circuit or, in another embodiment, operate independently perhaps in separate chips. The term "chip", as used herein, refers to an integrated circuit. Circuits and circuitry may comprise general or specific purpose hardware, or may comprise such hardware and associated software such as firmware or object code.

The terms "audio preamble" and "voice preamble" as used herein may refer to recorded voice inputs that a user records, to provide a question/prompt in human language, that also selectively incorporates responses in multiple choice format to aid selection by a recipient. The audio preamble may be captured by a mobile device in MP3 format, AMR format, WMA format, etc.

The term "audio-assisted questionnaire" as used herein may refer to a questionnaire comprising audio portions, such as audio preambles, audio supplementary information, audio descriptions of multiple choices, etc. that make it possible for a recipient to listen to most of the information of the questions in a questionnaire (employing human voices, in audible form) without having to read all of that in a small screen of a mobile device, without requiring scrolling through textual descriptions on a limited/constrained device.

As one of ordinary skill in the art will appreciate, the terms "operably coupled" and "communicatively coupled," as may be used herein, include direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled" and "communicatively coupled."

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the invention, as limited only by the scope of the appended claims.

The invention claimed is:

1. A server for distributing content to mobile devices, the server communicatively coupled to a mobile device of a user, the server comprising:
   at least one storage having stored therein one or both of firmware and software;
   at least one processor operably coupled to the at least one storage, wherein the at least one processor, during operation, at least:
      stores and manages a collection of user preferences and a collection of interactive media, wherein the user preferences comprise subscription information;
      receives interactive media from an external system and stores the interactive media in the at least one storage for subsequent retrieval and distribution;
      retrieves one or more user preferences for the user of the mobile device from the user preference collection and tailors the interactive media to the mobile device;

communicates the tailored interactive media to the mobile device, device in both pull and push mode distribution;

manages a plurality of queues of interactive media, wherein each of the plurality of queues of interactive media comprises one or more interactive media for distribution; and selects, for delivery to the user of the mobile device, one or more interactive media from the plurality of queues based upon user preferences for the user in the user preferences collection.

2. The server of claim 1, wherein the at least one processor, during operation, at least:

receives device capability information from the mobile device and tailors the interactive media to the mobile device based on the device capability information;

receives second interactive media from a second user;

modifies the second interactive media by incorporating text or graphics, and by inserting a prompt associated with the second user; and sends the modified second interactive media to recipients specified by the second user.

3. The server of claim 1 further comprising:

the server being communicatively coupled to a plurality of recipient devices, each of the plurality of recipient devices associated with one of a plurality of recipient users, each recipient user having corresponding recipient user preferences in the user preference collection;

the server determining device capabilities of each of the recipient devices, retrieving the corresponding recipient user preferences and tailoring the interactive media for each of the recipient devices based on the determined device capabilities; and the server delivering the tailored interactive media to the corresponding one of the recipient devices.

4. The server of claim 3 further comprising:

the server determining one of the plurality of recipient devices as a target device for the interactive media based on the user preferences collection and metadata associated with the interactive media; and the server disseminating the interactive media to the recipient target device in a form that is compatible with the capabilities of the recipient target device and in accordance with the preferences of the user of the recipient target device.

5. The server of claim 1, wherein the at least one processor, during operation, further at least:

receives the interactive media from the external system along with associated metadata;

categorizes the interactive media; and determines the suitability of the interactive media for specific users based on the user preferences collection.

6. The server of claim 1 further comprising:

wherein each of the plurality of queues is associated with one of a plurality of categories of interactive media, and wherein the plurality of categories of interactive media comprises interactive video clips, interactive music news items, interactive advertisements and interactive surveys; and wherein the server facilitates subscribing by the user to one or more of the plurality of categories of interactive media.

7. A system for subscribing to interactive media, the system comprising:

at least one server that facilitates user registration, wherein user registration comprises gathering account information, a username, a password, a user profile comprising interests and hobbies of the user, and user preferences for interactive media categories, the at least one server operable to, at least:

accept the user profile and facilitate the management of the user profile and the user preferences;

accept interactive media from an interactive media creator, wherein the interactive media comprises metadata, and wherein the metadata comprises one or more of a category identification, a target profile describing a likely profile of recipients expected to be interested in the interactive media, security information comprising credentials of a provider of the interactive media and authentication information, and/or a digital signature of the interactive media;

determine the user to be a potential recipient of the interactive media, based on the user profile and the metadata of the interactive media;

receive the interactive media and validate the interactive media;

add the interactive media to an interactive media queue for those of the plurality of users determined to be targets for delivery of the interactive media based on their user preferences and an active subscription; and send notifications to mobile devices associated with the users who are determined to be targets.

8. The system of claim 7, wherein the system further comprises:

the server storing user preferences provided by a plurality of users;

the server verifying that the targets for delivery of the interactive media have an active subscription; and the notifications comprising information on the availability of the interactive media in their associated interactive media queue.

9. A system for distributing interactive media to a plurality of mobile devices, the system comprising:

at least one storage arranged for storing interactive media and user profiles;

an operator interface for specification of required user profiles desired by individuals or companies interested in disseminating interactive media;

a delivery mechanism for distribution of interactive media to the plurality of mobile devices based at least on the required user profiles; and a media delivery and tracking component for storing results and activity logs for tracking interactive media creation, distribution, and related activities.

10. The system of claim 9 further comprising:

a billing system for billing one or both of creation of interactive media and distribution of interactive media;

the billing system charging recipients of interactive media a fee for viewing the interactive media; and the billing system charging an individual or a company a fee when a recipient views interactive media distributed to the recipient by the individual or company.

11. The system of claim 9, wherein the delivery mechanism comprises:

at least one server that maintains a plurality of queues of interactive media;

wherein a first portion of the plurality of queues is dedicated to specific categories of interactive media;

wherein a second portion of the plurality of queues is dedicated to specific companies creating the interactive media; and wherein a third portion of the plurality of queues is dedicated to specific user groups.

12. The system of claim 11, further comprising:
wherein the at least one server, in response to receiving a new interactive media entry to any of the plurality of queues of interactive media, identifies target recipients; and
wherein the at least one server communicates the new interactive media entry to the target recipients.

13. The system of claim 12, wherein the at least one server:
communicates, to the target recipients, a notification of the availability of the new interactive media entry; and
adds an entry to a queue of available interactive media assigned to each of the target recipients.

14. The system of claim 9, further comprising:
a personal computer with an interactive media creation tool that facilitates creation of the interactive media;
wherein the interactive media creation tool is arranged to upload the created interactive media for distribution to one or more recipients via the delivery mechanism; and
wherein the interactive media creation tool is arranged to receive user responses and usage information from the delivery mechanism.

15. The system of claim 14, further comprising:
wherein the delivery mechanism, based on a list of recipients provided by a user of the interactive media creation tool, sends the created interactive media to the listed recipients;
wherein the recipient list comprises contact information for one or more recipients;
wherein the contact information is presented in one or more formats including corresponding mobile phone numbers, Internet protocol (IP) addresses, and email addresses; and
wherein the delivery mechanism facilitates browsing of the created interactive media by a recipient user via their mobile device or corresponding one of the plurality of mobile devices.

16. The system of claim 11, further comprising:
wherein the at least one server communicates one or more notifications to at least one of the plurality of mobile devices;
wherein the one or more notifications are communicated via a short message service (SMS), an email service, a chat service, or by communicating a message to a mobile client in the at least one of the plurality of mobile devices; and
wherein the one or more notifications comprise a reference or link to interactive media and an opportunity to download a client component capable of displaying the interactive media.

* * * * *